UNITED STATES PATENT OFFICE.

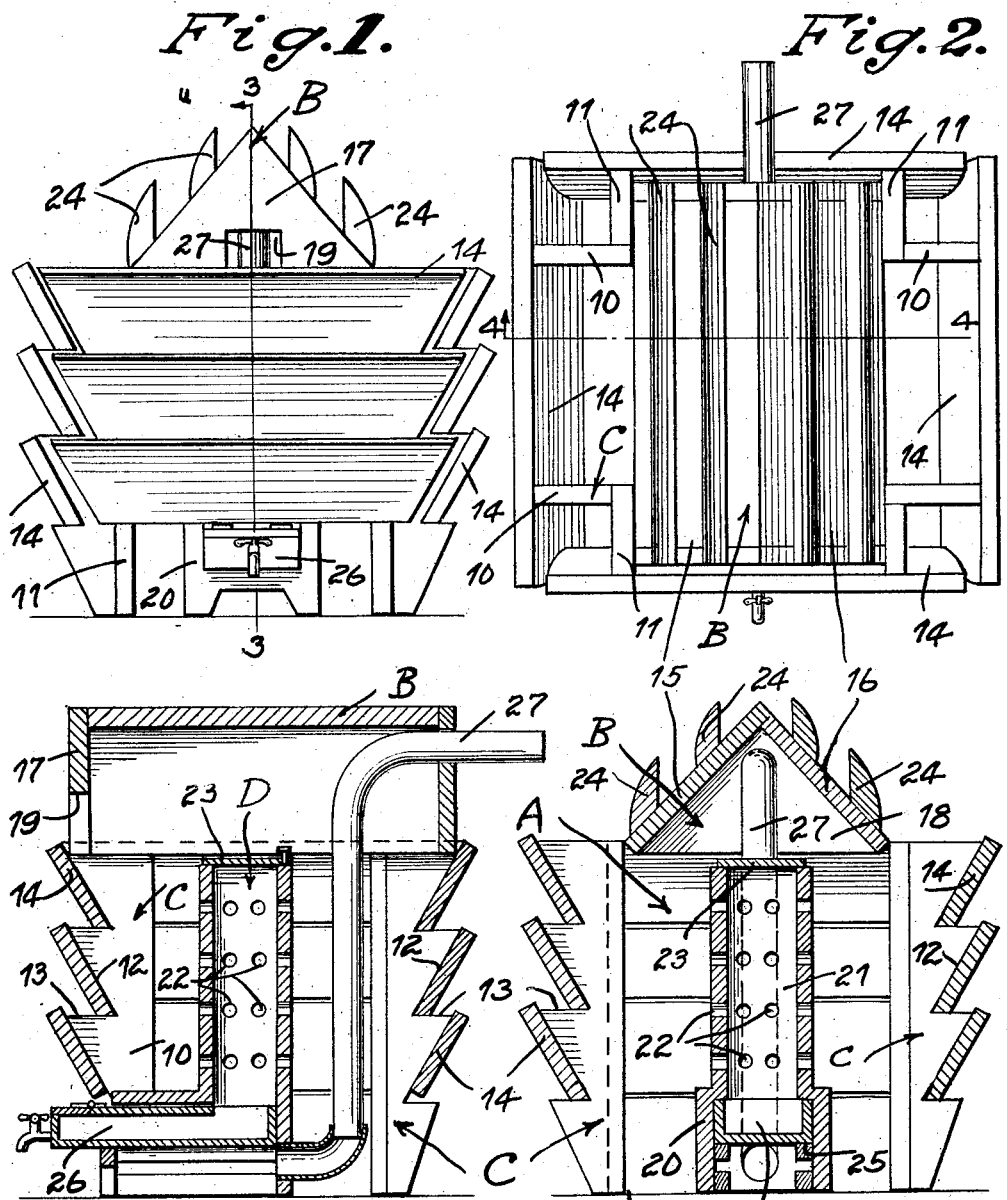

RICHARD McCLOY, OF LYNN HAVEN, FLORIDA.

SEED-GERMINATOR AND PLANT-FORCER.

1,109,687.

Specification of Letters Patent.

Patented Sept. 8, 1914.

Application filed November 10, 1913. Serial No. 800,169.

*To all whom it may concern:*

Be it known that I, RICHARD McCLOY, a citizen of the United States, residing at Lynn Haven, in the county of Bay, State of Florida, have invented certain new and useful Improvements in Seed-Germinators and Plant-Forcers; and I do hereby declare the following to be a full, clear, and exact description of the invention, such as will enable others skilled in the art to which it appertains to make and use the same.

This invention relates to devices for germinating seed and forcing the plants resulting therefrom.

The object of the invention resides in the provision of a device of the character named which will enable an exceedingly large number of plants to be grown and matured at a time when such plants could not be grown when subjected to the natural elements.

A further object of the invention resides in the provision of a device of this character in which the plants carried thereby will be subjected to an artificial heat and thereby forced to maturity in advance of the date they would naturally mature.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a side elevation of the invention; Fig. 2, a plan view thereof; Fig. 3, a section on the line 3—3 of Fig. 1, and Fig. 4, a section on the line 4—4 of Fig. 2.

Referring to the drawings the invention is shown as comprising a base or body member A, and a removable top member B.

The base or body member A is formed of a plurality of corner members C having an angular cross section forming arms 10 and 11. The outer edges of the arms 10 and 11 are stepped to form an inclined portion 12 and a horizontal portion 13, the portion 12 being inclined inwardly. Secured against the inclined edges 12 and resting upon the horizontal edges 13 are beams 14, which, as will be obvious, are also inclined inwardly.

The top member B is shown as comprising a housing having a triangular cross section and including sloping sides 15 and 16, and end members 17 and 18 the former of said end members being provided with a recess 19.

Disposed within the body member A is a heating device D which comprises a base portion 20 in which a fire is adapted to be built and an upwardly extending portion 21 disposed at one end of the base for the purpose of conveying heat upwardly through the medium of the products of combustion, the wall of said portion being provided with a plurality of openings 22 to permit the lateral escape of heat. Mounted on the top of the portion 21 is a damper 23.

Mounted on the sloping sides 15 and 16 of the top member B and disposed longitudinally of said sides are upwardly extending plates 24 between which soil is adapted to be deposited to receive the seed.

The base 20 is shouldered as at 25 and seated upon these shoulders 25 is a vessel or boiler 26 which is adapted to be filled with water when fire is present in the base 20. In this manner a moist heat is discharged through the opening 22 and the germination of the seed and forcing of the plants enhanced. A suitable smoke pipe 27 leads from the rear end of the base 20 and discharges through the end member 18 of the top B.

In the use of the device the heating device D is placed within the base or body member A with the open end of the base 20 of the heating device disposed substantially in the plane of one side of the body and just beneath the lowermost beam 14. The interior of the base or body is then filled with earth which surrounds the chimney portion 21 of the heating device. The top member B is then supported upon the body as shown in the drawing. Earth is then deposited in the space between the plate 24. The desired seeds are then planted in the earth between the beams 14 and the plates 24 and a fire lighted in the heating device. The heat generated by the heating device D will pass into the soil in which the seeds are planted and accelerate the germination of said seeds and force the growth of the resulting plants.

What is claimed is:—

1. In a device of the class described the combination of a body adapted to support soil within same, said body member comprising corner members having an angular cross section and resulting arm portions, said arm portions having their outer edges stepped to form inwardly inclined portions and horizontally inclined portions, side members secured against said inwardly inclined portions, and means for heating the soil disposed within the body.

2. In a device of the class described, the combination of a body adapted to support soil within same, means for heating the soil disposed within the body, and a removable top member supported by the body and comprising a housing having sloping side members, and plates secured to said side members longitudinally thereof and in spaced relation to each other.

In testimony whereof, I affix my signature, in the presence of two witnesses.

RICHARD McCLOY.

Witnesses:
T. B. D. GAINER,
T. F. TILLER.

Copies of this patent may be obtained for five cents each, by addressing the "Commissioner of Patents, Washington, D. C."